Patented Mar. 14, 1944

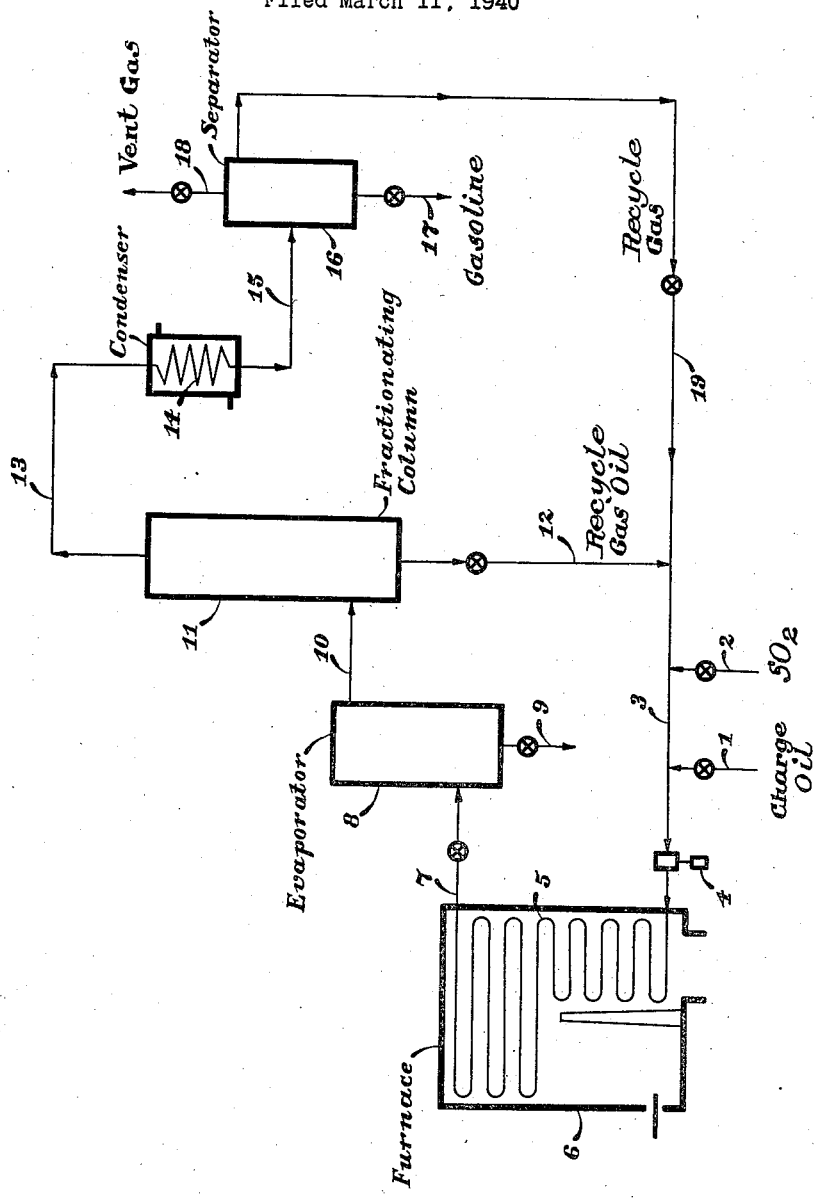

2,343,927

UNITED STATES PATENT OFFICE 2,343,927

CONVERSION OF HYDROCARBON OILS

Oscar L. Roberts, Drexel Hill, Pa., assignor to The Atlantic Refining Company, Philadelphia, Pa., a corporation of Pennsylvania Application March 11, 1940, Serial No. 323,274

7 Claims. (Cl. 196—52)

The present invention relates to the treatment of hydrocarbons for the purpose of producing therefrom an improved motor fuel. In its more specific aspects, the present invention relates to the conversion of higher boiling hydrocarbon oils into lower boiling oils, and particularly the conversion of relatively heavy hydrocarbon oil into hydrocarbons boiling within the gasoline boiling range.

In accordance with the present invention hydrocarbon oils, such as crude petroleum, petroleum residuum, or gas oil, are subjected to treatment for the conversion thereof into gasoline. Such treatment comprises essentially a cracking operation wherein the hydrocarbon oil is subjected to cracking conditions of temperature and pressure, in the presence of added quantities of sulfur dioxide ($SO_2$), for a period of time sufficient to convert a substantial proportion of the high boiling oil into motor fuel of the gasoline boiling range. The thermal treatment may be effected at temperatures of from 850° F. to 1000° F., and at superatmospheric pressures not substantially in excess of about 3000 lbs. per sq. in., and preferably at pressures of the order of 500 to 1500 lbs. per sq. in. The cracking reaction period may range from 15 to 180 seconds and is preferably of the order of 30 to 60 seconds. The quantity of sulfur dioxide employed may vary from 0.1 per cent to 3.0 per cent by weight, the preferred amount being from 0.3 per cent to 1.5 per cent by weight. Cracking catalysts of the nature of adsorbent earths, such as fuller's earth, acid activated clays, bentonite, bauxite, silica gel, and synthetic silicates may be utilized, although such catalysts are not essential to the successful operation of the process. The crude products from the cracking operation may be separated by fractional distillation, whereby there may be recovered a gasoline fraction of desired boiling range, tar, recycle gas oil, and gases which may be recycled to the conversion process.

My invention may be further understood with reference to the accompanying drawing, which represents diagrammatically a system suitable for carrying out my process.

The high boiling hydrocarbon oil to be converted, for example, gas oil, and the desired quantity of $SO_2$ may be simultaneously supplied to pump 4 through pipe 3, the oil and $SO_2$ being introduced thereinto by means of valve-controlled pipes 1 and 2, respectively. The mixture of oil and $SO_2$ is forced through the heating coil 5 disposed in a furnace 6, wherein the temperature of the mixture is raised, for example, to about 850° F., the pressure being of the order of 750 lbs. per sq. in., and the reaction period about 30 seconds. As a result of the thermal treatment, the gas oil is decomposed with the production of gasoline hydrocarbons, recycle gas oil, tar, and hydrocarbon gases, the $SO_2$ reacting with components of the oil and assisting in the cracking reaction. Of the $SO_2$ originally charged to the system with the gas oil, a substantial proportion, for example, 80 per cent to 90 per cent, undergoes decomposition or reaction, or a combination thereof as the case may be, with the oil components, the sulfur finally appearing as $H_2S$ and the oxygen as water, in the products of the cracking reaction. The cracked products from the furnace coil 5 are introduced into evaporator 8 by means of valve-controlled pipe 7, the pressure upon the products preferably being reduced to the order of about 50 lbs. per sq. in. prior to the introduction thereof into the evaporator. In the evaporator, tarry material may be separated from the vaporous cracked products and withdrawn by means of valve-controlled pipe 9. The vaporous products, i. e., gasoline, recycle gas oil and gases are passed from the evaporator by means of pipe 10 into a fractionating column 11, wherein the gasoline and gases may be separated from the recycle gas oil resulting from the cracking treatment. The recycle gas oil may be withdrawn from the bottom of column 11 and passed by means of valve-controlled pipe 12 into pipe 3 for recirculation to the cracking furnace coil 5. Gasoline vapors and gases are passed from the top of fractionating column 11 through pipe 13 to condenser 14, wherein the gasoline vapors are condensed, and the liquid condensate and uncondensed gases are passed by pipe 15 into separator 16. In separator 16 the condensate, i. e., gasoline, is separated from the uncondensed gases and is withdrawn therefrom by means of valve-controlled pipe 17. This gasoline may then be treated for the removal of acid gases such as $H_2S$ and $SO_2$ by neutralization with caustic soda solution and water washing.

The uncondensed gases, including $H_2S$, $SO_2$, and gaseous hydrocarbons, accumulating in the upper portion of separator 16, may be vented through valve-controlled pipe 18 or may be recirculated to the cracking furnace coil by means of valve-controlled pipe 19, pipe 3, and pump 4. Or a portion of the gases may be vented, and the remainder recirculated as above described.

My invention may be further illustrated by the following examples, which include runs made in the presence and in the absence of $SO_2$. In the examples a gas oil having a boiling range of 409° F. to 747° F. and an A. P. I. gravity of 26.8° was subjected to single pass cracking without recyling in the presence and in the absence of $SO_2$, the cracking temperature being 850° F., the pressure 750 lbs. per sq. in., and the cracking time approximately 30 seconds. The liquid product recovered from the cracking operation was distilled to separate a gasoline fraction having a distillation end point of 400° F., a gas oil fraction boiling from about 400° F. to 750° F., and tar.

| Products | Weight percent $SO_2$ | | | |
|---|---|---|---|---|
| | 0.00 | 0.303 | 0.605 | 1.21 |
| 400° F., E. P. gasoline: | | | | |
| Vol. percent of charge | 13.2 | 14.7 | 15.8 | 17.2 |
| A. P. I. gravity_____degrees | 55.4 | 54.4 | 55.0 | 55.3 |
| Octane value | 66 | .67 | 69 | 67 |
| Gas oil 400° F.-750° F.: Vol. percent of charge | 77.2 | 78.1 | 76.0 | 74.1 |
| Tar: Vol. percent of charge | 7.7 | 5.5 | 6.9 | 7.1 |
| Gas and loss: Vol. percent of charge | 1.9 | 1.7 | 1.3 | 1.6 |

From the above results, it will be seen that in accordance with my invention I am able to effect a substantial increase in yield of gasoline of improved anti-knock value, without excessive production of tar. While, hereinabove, I have shown the conversion of a cracking stock such as gas oil, it is to be understood that my invention is equally well adapted to the conversion of other high boiling hydrocarbon oils, including crude petroleum, petroleum residuum, asphaltic oils, oils or residues from the hydrogenation or polymerization of petroleum hydrocarbons, and the like.

What I claim is:

1. A process for the conversion of hydrocarbons of high boiling point into those of lower boiling point, which comprises subjecting said hydrocarbons to cracking conditions of temperature and pressure, in the presence of from 0.3 per cent to 3 per cent by weight of sulfur dioxide, and in the absence of water or water vapors introduced from an extraneous source.

2. A process for the conversion of hydrocarbons of high boiling point into those of lower boiling point, which comprises heating said hydrocarbons to a temperature of from 850° F. to 1000° F., in the presence of from 0.3 per cent to 3 per cent by weight of sulfur dioxide, and in the absence of water or water vapors introduced from an extraneous source.

3. A process for the conversion of hydrocarbons of high boiling point into those of lower boiling point, which comprises heating said hydrocarbons to a temperature of from 850° F. to 1000° F. and under a substantial superatmospheric pressure, in the presence of from 0.3 per cent to 3 per cent by weight of sulfur dioxide, and in the absence of water or water vapors introduced from an extraneous source.

4. A process for the conversion of hydrocarbons of high boiling point into those of lower boiling point, which comprises heating said hydrocarbons to a temperature of from 850° F. to 1000° F., under a superatmospheric pressure not substantially in excess of about 3000 lbs. per square inch, in the presence of from 0.3 per cent to 3 per cent by weight of sulfur dioxide, and in the absence of water or water vapors introduced from an extraneous source.

5. A process for the conversion of hydrocarbons of high boiling point into those of lower boiling point, which comprises heating said hydrocarbons to a temperature of from 850° F. to 1000° F., under a pressure of from 500 to 1500 lbs. per square inch, in the presence of from 0.3 per cent to 1.5 per cent by weight of sulfur dioxide, and in the absence of water or water vapors introduced from an extraneous source and separating from the resulting conversion products a hydrocarbon fraction of gasoline boiling range.

6. A process for the conversion of hydrocarbons of high boiling point into those of lower boiling point, which comprises heating said hydrocarbons to a temperature of from 850° F. to 1000° F., in the presence of an incombustible, solid adsorbent catalyst and from 0.3 per cent to 1.5 per cent by weight of sulfur dioxide, and separating from the resulting conversion products a hydrocarbon fraction of gasoline boiling range.

7. A process for the conversion of hydrocarbons of high boiling point into those of lower boiling point, which comprises subjecting said hydrocarbons to cracking conditions of temperature and pressure, in the presence of an incombustible, solid adsorbent catalyst and a small added quantity of a cracking accelerator consisting of sulfur dioxide.

OSCAR L. ROBERTS.